United States Patent
Conrad et al.

(10) Patent No.: US 6,938,564 B2
(45) Date of Patent: Sep. 6, 2005

(54) METHOD AND SYSTEM FOR CONCENTRATING CHEMICAL GRANULES AROUND A PLANTED SEED

(75) Inventors: Larry M. Conrad, Delta, IA (US); Richard Porter, Ankeny, IA (US)

(73) Assignee: AMVAC Chemical Corporation, Newport Beach, CA (US)

( * ) Notice: Subject to any disclaimer, the term of this patent is extended or adjusted under 35 U.S.C. 154(b) by 23 days.

(21) Appl. No.: 10/801,656

(22) Filed: Mar. 17, 2004

(65) Prior Publication Data

US 2004/0244658 A1 Dec. 9, 2004

Related U.S. Application Data

(60) Provisional application No. 60/505,343, filed on Jun. 3, 2003.

(51) Int. Cl.[7] ............... A01C 7/00; A01C 9/00
(52) U.S. Cl. ...................................... 111/170
(58) Field of Search ............... 111/170, 173, 111/177–188, 77; 221/211

(56) References Cited

U.S. PATENT DOCUMENTS

| | | | | |
|---|---|---|---|---|
| 3,581,945 A | * | 6/1971 | Savage | 222/109 |
| 4,541,549 A | * | 9/1985 | Hadley et al. | 222/143 |
| 4,779,765 A | * | 10/1988 | Neumeyer | 222/142 |
| 4,895,106 A | * | 1/1990 | Barnes | 118/684 |
| 4,971,255 A | | 11/1990 | Conrad | |
| 5,271,343 A | | 12/1993 | House | |
| 5,301,848 A | | 4/1994 | Conrad et al. | |
| 2002/0088383 A1 | * | 7/2002 | Barry et al. | 111/181 |

FOREIGN PATENT DOCUMENTS

| CA | 2248436 | * | 3/2000 |
|---|---|---|---|

OTHER PUBLICATIONS

SMARTBOX™SYSTEM, at http://www.AMVAC–chemical.com/product_pages/product_smartbox/smartbox_intro.htm (last visited Jun. 16, 2004).

* cited by examiner

*Primary Examiner*—Christopher J. Novosad
(74) *Attorney, Agent, or Firm*—McDermott Will & Emery LLP

(57) ABSTRACT

A system or method for dispensing seeds and chemical granules, in which chemical granules are dispensed through a granule tube into a seed dispensing tube, where the granule tube is connected to the seed dispensing tube at a location above a lower opening of the seed dispensing tube, and where the lower opening of the seed dispensing tube is covered with a brush. A seed is dispensed through the seed dispensing tube. The brush holds chemical granules within the seed dispensing tube such that chemical granules accumulate within the seed dispensing tube, and the brush allows a seed and accumulated chemical granules to pass through the lower opening when the seed is dispensed via the seed dispensing tube.

22 Claims, 4 Drawing Sheets

METHOD AND SYSTEM FOR CONCENTRATING CHEMICAL GRANULES AROUND A PLANTED SEED

RELATED APPLICATIONS

This application claims priority of Provisional Patent Application No. 60/505,343, filed Jun. 3, 2003.

INCORPORATION BY REFERENCE

The present application incorporates herein by reference U.S. Pat. No. 5,301,848 entitled "Electromagnetic Meter For Closed Dispensing Container" to Conrad, et al., and U.S. Pat. No. 4,971,255 entitled "Granular Chemical Bander" to Conrad, in their entirety and, as such, are hereby made part of this application.

FIELD OF THE INVENTION

The present invention relates to a method and system for releasing seeds and chemical granules at a predetermined timing and, more particularly, to a method and system for releasing chemical granules in close proximity to a planted seed using either a closed or open dispensing system.

BACKGROUND OF THE INVENTION

Over the past decade, planting and chemical granular dispensing systems for dispensing seed and insecticides, herbicides, fungicides or fertilizers, have made the handling of seed and chemical granules less hazardous to the agricultural worker by providing a closed container system, such as those described in U.S. Pat. No. 5,301,848 and U.S. Pat. No. 4,971,255, incorporated by reference herein and the SmartBox® System marketed by AMVAC Chemical Corporation (See SmartBox System®, at http://www.amvac-chemical.com/product_pages/product_smartbox/smart$_{13}$ intro.htm (last visited Jan. 7, 2004)). Briefly, as described in U.S. Pat. No. 5,301,848, access to and from a container in a closed container system is available through a single opening in the bottom wall of the container, offering distinct advantages over an open-top, non-removable container design in an open container system.

Closed container systems provide a removable container which is pre-filled with the chemical granules of toxic materials such as insecticides, fertilizers, herbicides and other pesticides, thereby eliminating the need to open and pour bags of chemical granules into storage hoppers. Since the closed container system is largely not open to the air, agricultural workers have less opportunity to come into contact with the chemical granules, thereby reducing skin and inhalation exposure to the hazardous chemicals.

While closed container systems reduce the risk of chemical exposure to agricultural works and others and still dispense the insecticides, pesticides, herbicides or fertilizers based on a desired rate, the amount of chemical granules dispensed is often still greater than what is needed to provide a desired effect. For instance, U.S. Pat. No. 5,271,343 describes a planter system in which chemical granules are dispensed along the entire length of the seed furrow, or trench. In this situation, much of the dispensed chemical granules in the seed furrow are not effectively used due to the distance from the planted seed, reducing overall efficiency.

University research has indicated that it is inefficient to use the conventional method of dispensing chemical granules, in which chemical granules are dispersed over an entire length of the seed furrow in which seed is planted. Instead, dispensing smaller amounts of the chemical granules of insecticides and other pesticides in close proximity to the seed not only obtains the desired effect of eliminating insects or pests, but also reduces the amount of chemical agent that is used to obtain such an effect. As such, the result is more cost effective, environmentally friendly, and less hazardous, while maintaining the desired effect of the chemical granules.

SUMMARY OF THE INVENTION

The present invention addresses the foregoing deficiencies of the prior art by providing a method and apparatus to increase the effectiveness of soil-applied chemicals at planting by inducing seed and chemical granules into the same seed dispensing tube, delivering the chemical granules and a seed in close proximity with each other in such a way that the chemical granules are dispersed with the seed as the seed passes through the seed dispensing tube.

According to one aspect of the invention, a planter unit includes a seed dispensing tube for dispensing seeds, including an upper opening for receiving a seed and a lower opening for dispensing the seed, and a brush covering the lower opening. The planter unit also includes a granule tube connected to the seed dispensing tube at a location above the lower opening for dispensing chemical granules into the seed dispensing tube. The brush holds chemical granules within the seed dispensing tube such that chemical granules accumulate within the seed dispensing tube, and the brush allows a seed and accumulated chemical granules to pass through the lower opening when a seed is dispensed via the seed dispensing tube.

According to an additional aspect of the invention, a seed and chemical granule dispensing system includes a seed hopper for storing seeds, a granule storage hopper for storing chemical granules, and a planter unit. The planter unit includes a seed dispensing tube for dispensing seeds stored in the seed hopper, including an upper opening for receiving a seed and a lower opening for dispensing the seed, and a brush covering the lower opening. The planter unit further includes a granule tube for dispensing chemical granules stored in the granule storage hopper into the seed dispensing tube, connected to the seed dispensing tube at a location above the lower opening. The brush holds chemical granules within the seed dispensing tube such that chemical granules accumulate within the seed dispensing tube, and the brush allows a seed and accumulated chemical granules to pass through the lower opening when a seed is dispensed via the seed dispensing tube.

According to a further aspect of the invention, a method of dispensing seeds and chemical granules includes the step of dispensing chemical granules through a granule tube into a seed dispensing tube, where the granule tube is connected to the seed dispensing tube at a location above a lower opening of the seed dispensing tube, and where the lower opening of the seed dispensing tube is covered with a brush. The method also includes the step of dispensing a seed through the seed dispensing tube. The brush holds chemical granules within the seed dispensing tube such that chemical granules accumulate within the seed dispensing tube, and the brush allows a seed and accumulated chemical granules to pass through the lower opening when a seed is dispensed via the seed dispensing tube.

The present invention significantly improves the placement of chemical granules with a planted seed and may significantly reduce the amount of chemical granules dispensed during planting.

DETAILED DESCRIPTION OF THE PREFERRED EMBODIMENT

The present invention is directed to a seed and chemical dispensing system including a seed hopper for storing seeds, a granule storage hopper for storing chemical granules, and a planter unit. The planter unit includes a seed dispensing tube for dispensing seeds stored in the seed hopper, including an upper opening for receiving a seed and a lower opening for dispensing the seed, and a brush covering the lower opening. The planter unit further includes a granule tube for dispensing chemical granules stored in the granule storage hopper into the seed dispensing tube, connected to the seed dispensing tube at a location above the lower opening. The brush holds chemical granules within the seed dispensing tube such that chemical granules accumulate within the seed dispensing tube, and the brush allows a seed and accumulated chemical granules to pass through the lower opening when a seed is dispensed via the seed dispensing tube.

Figure 1:
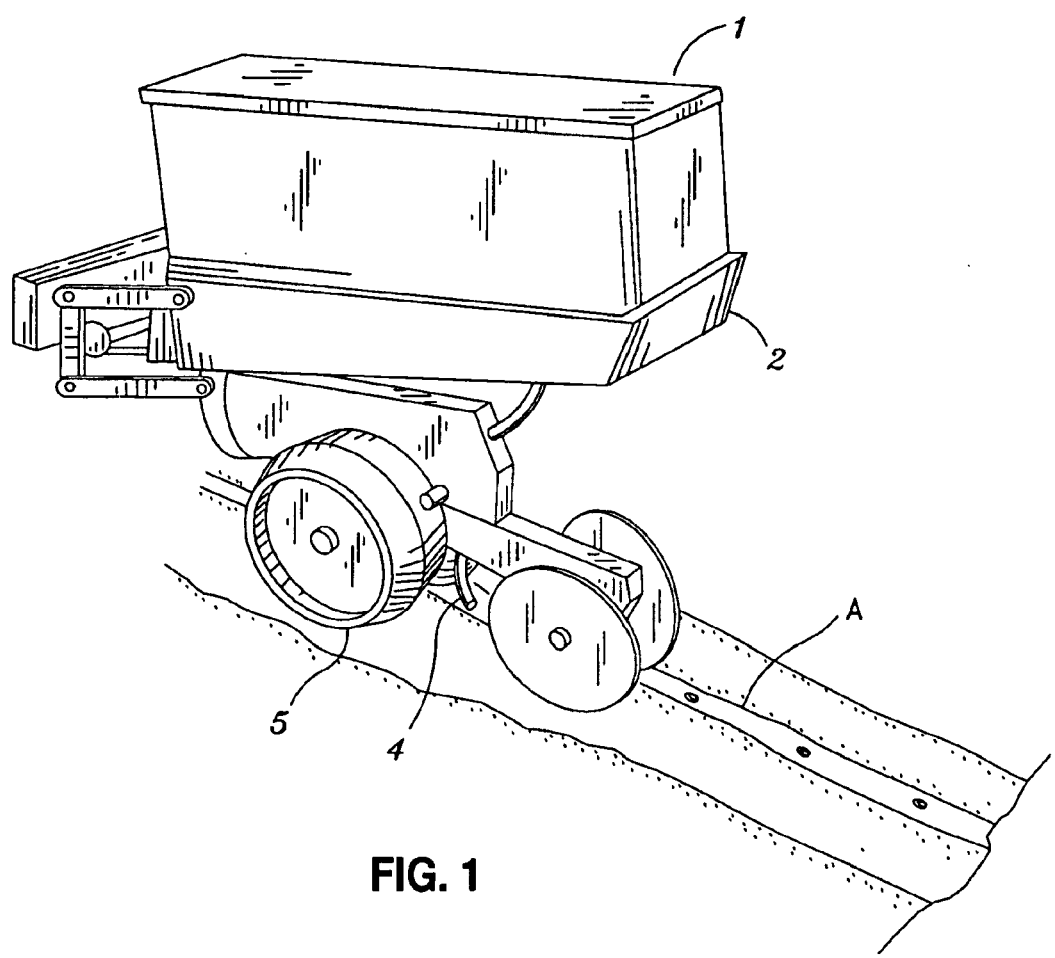
FIG. 1 is an outward appearance of the present invention for dispensing seeds and chemical granules within close proximity of each other.

FIG. 1 is an outward appearance of a closed container system which includes the present invention. Specifically, closed container system 1 includes a seed compartment and a granule storage compartment for holding insecticide or other pesticides. Closed container system 1 sits on top of planter unit 2, and is removable from planter unit 2. As such, closed container system 1 can be returned to the seed and insecticide distributor for refilling.

Planter unit 2 follows behind a seed trenching unit (not shown) or includes a seed trenching unit (not shown). In either case, a seed furrow A is trenched in the soil. As will be discussed below in more detail, the seed and the chemical granules are combined and passed through a seed dispensing tube of planter unit 2, which includes an output 4 immediately before disking wheels 5. Disking wheels 5 turns the soil to cover seed furrow A which includes the dispensed seed and chemical granules.

Figure 2:
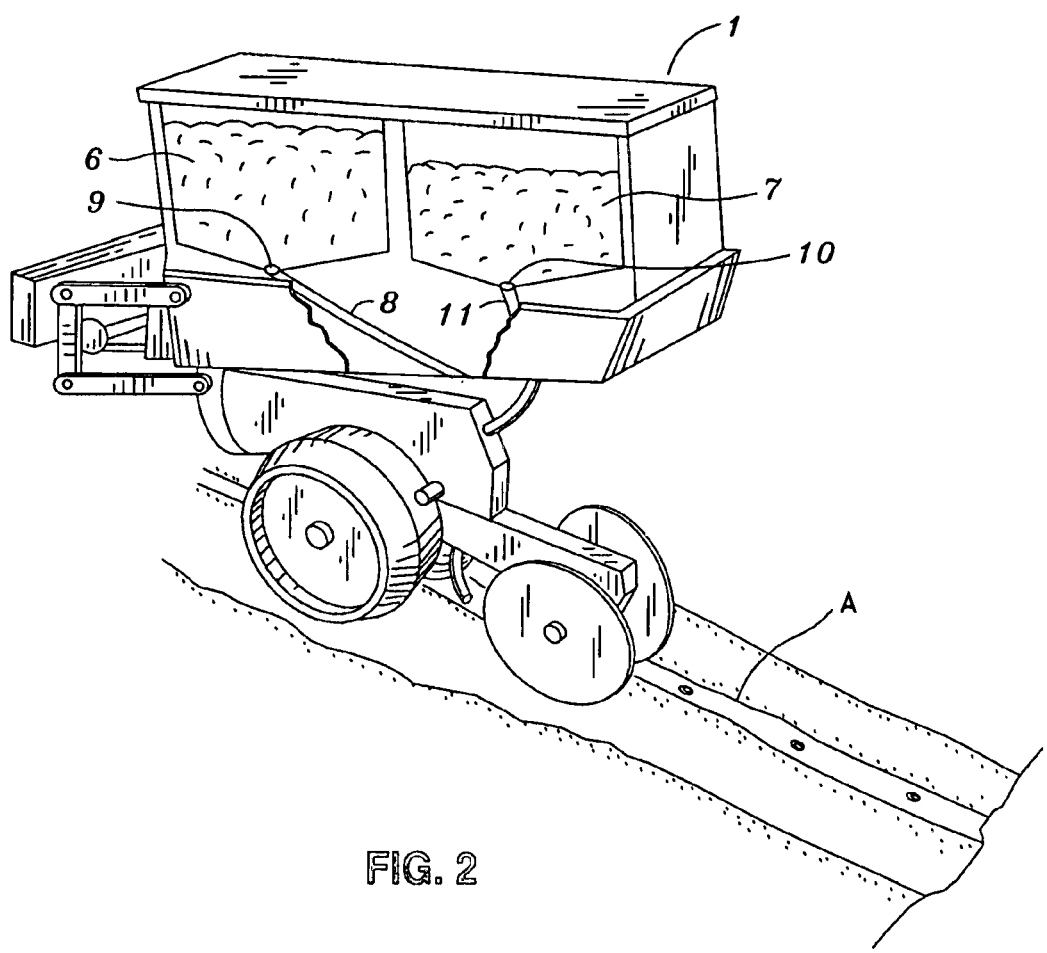
FIG. 2 is a schematic view of the seed and chemical granule dispensing tube system according to the present invention.

As shown in FIG. 2, closed container system 1 includes seed hopper 6 and granule storage hopper 7. At the bottom of seed hopper 6 is seed dispensing tube 8 in which seeds are dispatched from seed hopper 6 in a metered fashion. Specifically, at the bottom of seed hopper 6, there exists a gate or door 9 which is either mechanically or electronically opened and closed to allow a single seed to be deposited in a seed furrow. The manner in which the seed is metered or dispensed is similar to the method disclosed in U.S. Pat. No. 5,301,848, which is incorporated herein by reference.

Granule storage hopper 7 has a discharge opening 10 which is connected to granule tube 11. Unlike seed dispensing tube 8, granule storage hopper 7 does not include a gate or door which opens or closes in order to permit the flow of chemical granules. Rather, the chemical granules freely flow, via gravity, from granular storage hopper 7 into granule tube 11. As will be discussed below, granule tube 11 connects with seed dispensing tube 8.

Figure 3:
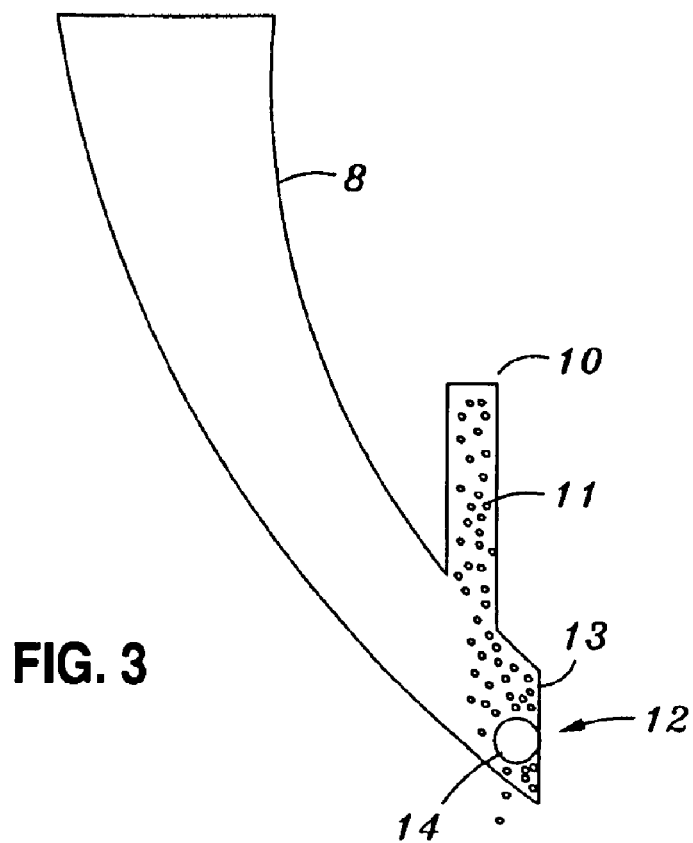
FIG. 3 is a schematic view of the seed and chemical granule dispensing system of the present invention.

As shown in FIG. 3, granule tube 11 is connected to seed dispensing tube 8 at which point free flowing chemical granules flow into the end of seed dispensing tube 8. The chemical granules are held within seed dispensing tube 8 by brush 12 which is placed at the lower, output opening 13 of seed dispensing tube 8.

Figure 4:
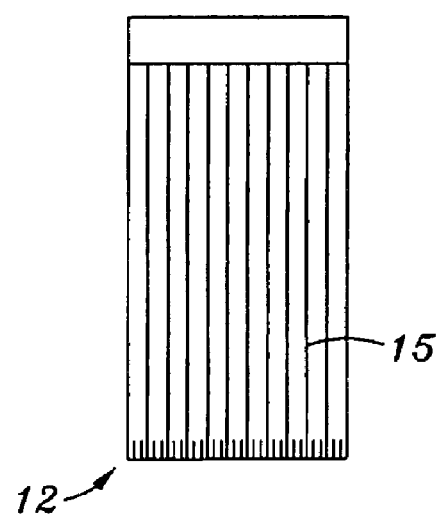
FIG. 4 is a schematic view of the brush gate at the lower end of the seed and chemical granule dispensing system in FIG. 3.

As shown in FIG. 4, brush 12 is made up of many fine bristles 15 which are placed at the lower opening 13 of seed dispensing tube 8. Bristles 15 are fine enough to prevent granules of pesticides, fertilizers or herbicides from passing, but are not so firm as to prevent a seed, such as corn or soybean, from pushing past the bristles. Bristles 15 have a diameter of 0.008 inches, although in additional aspects these bristles may optionally be larger or smaller, depending upon the application. In this regard, for John Deere-type planter units, the seed dispensing tube 8 is fitted with a one and a half inch long and a half inch wide brush which is mounted inside the seed dispensing tube 8 to protect the brush 12 from dirt and damage.

Chemical granules are held within seed dispensing tube 8 by brush 12 and are not dispensed until a seed drops through seed dispensing tube 8, pushing the smaller and lighter granules past brush 12. Both the seed and the chemical granules enter the seed dispensing tube 8 above brush 12 such that when gravity draws the seed down through the seed dispensing tube 8, it first encounters the chemical granules which are built up behind brush 12 and then passes through brush 12, thereby releasing the chemical granules within close proximity to the seed in seed furrow A. In this regard, as a seed is dispensed from seed hopper 6 through seed dispensing tube 8, after gate 9 opens, gravity drops the seed through seed dispensing tube 8 at which point it collides with the chemical granules accumulated behind brush 12. Since the seed is much larger and heavier than the chemical granules which have built up behind brush 12, the seed forces the granules past brush 12, thereby causing granules collected behind brush 12 to dispense at the same time the seed passes through brush 12.

Seed dispensing tube 8 also is provided with overflow hole 14. Overflow hole 14 prevents an excessive buildup of chemical granules which could possibly prevent the seed from passing through seed dispensing tube 8. By virtue of the foregoing, only a certain amount of chemical granules are permitted to build up behind brush 12, which is designed to hold back chemical granules, but which allows a seed to pass so as to release the chemical granules which have built up behind the brush.

The closed container system including the invention, as depicted in FIG. 2, provides a pre-filled, removable container which eliminates the need to open and pour bags of chemical granules into storage hoppers. Since this closed container system is largely not open to the air, workers using the seed and chemical dispensing system will have less opportunity to come into contact with the chemical granules, thereby reducing skin and inhalation exposure to the pesticides, fertilizers, or other hazardous chemicals.

Similarly, the closed container system has the advantage over the conventional seed and chemical dispensing system of efficiently dispensing chemical granules in the vicinity of the seed, not over an entire length of the seed furrow in which seed is planted. Since the present invention dispenses smaller amounts of the chemical granules of insecticides and other pesticides in close proximity to the seed, insects or pests continue to be eliminated while reducing the amount of chemical agent required to obtain the effect. Benefits also include increased cost effectiveness, and lowered hazardous chemical exposure risks, while reducing the amount of chemical granules dispensed.

Figure 5:
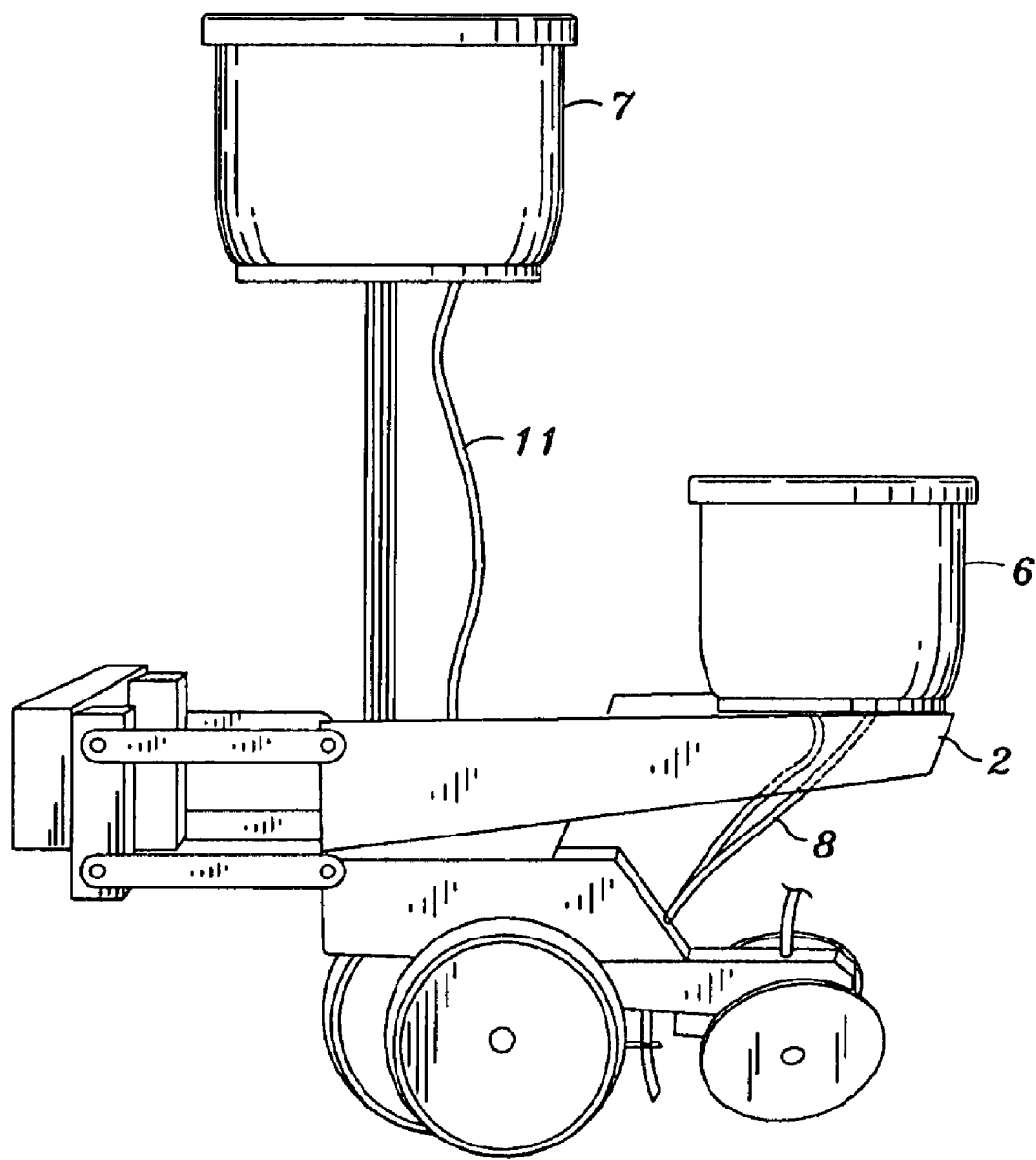
FIG. 5 is an outward appearance of an alternative embodiment of the present invention.

FIG. 5 depicts an alternative arrangement of the seed and chemical granule dispensing system of the present invention. The invention, as depicted in FIG. 5, is also directed to a seed and chemical dispensing system including a seed hopper for storing seeds, a granule storage hopper for storing chemical granules, and a planter unit. The planter unit includes a seed dispensing tube for dispensing seeds stored in the seed hopper, including an upper opening for receiving a seed and a lower opening for dispensing the seed, and a brush covering the lower opening. The planter unit further includes a granule tube for dispensing chemical granules stored in the granule storage hopper into the seed dispensing tube, connected to the seed dispensing tube at a location above the lower opening. The brush holds chemical granules within the seed dispensing tube such that chemical granules accumulate within the seed dispensing tube, and the brush allows a seed and accumulated chemical granules to pass through the lower opening when a seed is dispensed via the seed dispensing tube.

The arrangement of the invention depicted in FIG. 5 is similar in structure, and shares many of the same reference numbers with the arrangement depicted in FIGS. 1 to 4. Specifically, this arrangement also includes a seed hopper 6 for storing seeds, and a granule storage hopper 7 for holding insecticide or other pesticides. As depicted in FIG. 5, seed hopper 6 and granule storage hopper 7 are separate closed containers, which sit on top of planter unit 2, and are removable from planter unit 2.

At the bottom of seed hopper 6 is a seed dispensing tube 8, in which seeds are dispatched from seed hopper 6. In further aspects of the invention, seeds are dispatched from seed hopper 6 in a metered fashion, in a manner similar to the method disclosed in U.S. Pat. No. 5,301,848, which is incorporated herein by reference.

Granule storage hopper 7, which is positioned at a location above seed hopper 6, includes granule tube 11, which permits the free flow of chemical granules from the granule storage hopper 7 into granule tube 11 and seed dispensing tube 8.

The connection of the granule tube 11 to the seed dispensing tube 8, as well as the operation of the brush 12 is similar to that depicted in FIGS. 3 and 4, and described above. Specifically, bristles 15, comprising brush 12, are fine enough to prevent granules of pesticides, fertilizers or herbicides from passing through the output 4 of the seed dispensing tube 8, but are not so firm as to prevent a seed and any accumulated chemical granules from pushing past the bristles. As such, as a seed is dispensed from seed hopper 6 through seed dispensing tube 8, the seed collides with the chemical granules built up behind the brush 12, causing the granules collected behind brush 12 to dispense at the same time the seed passes through the brush 12.

As shown in FIG. 4, brush 12 is made up of many fine bristles 15 which are placed at the lower opening 13 of seed dispensing tube 8. Bristles 15 have a diameter of about 0.008 inches, although in additional aspects these bristles may optionally be larger or smaller, depending upon the application. In this regard, for John Deere-type planter units, the seed dispensing tube 8 is fitted with a one and a half inch long and a half inch wide brush which is mounted inside the seed dispensing tube 8 to protect the brush from dirt and damage.

Since the granule storage hopper 7 is placed higher than the seed hopper, however, when using smaller granules, there is enough drop to facilitate the flow of material to the seed dispensing tube. Various heights may be used to effect flow rates of various chemical granules.

The system including the invention, as depicted in FIG. 5, provides a portable container which eliminates the need to expose agricultural workers to chemical granules. Additionally, this container system has the advantage over the previous systems of efficiently dispensing chemical granules near the seed, not over an entire length of the seed trench or furrow. Furthermore, since the present invention dispenses smaller amounts of the chemical granules of insecticides and other pesticides in close proximity to the seed, insects or pests are eliminated while using a more efficient amount of chemical agent.

The invention also contemplates a method of dispensing seeds and chemical granules. The method includes the step of dispensing chemical granules through a granule tube into a seed dispensing tube, where the granule tube is connected to the seed dispensing tube at a location above a lower opening of the seed dispensing tube, and where the lower opening of the seed dispensing tube is covered with a brush. The method of dispensing seeds and chemicals also includes the step of dispensing a seed through the seed dispensing tube. The brush holds the chemical granules within the seed dispensing tube such that chemical granules accumulate within the seed dispensing tube, and the brush allows a seed and accumulated chemical granules to pass through the lower opening when the seed is dispensed from the seed dispensing tube.

In preferred aspects of the invention, one seed is dispensed through the seed dispensing tube at a time. In further preferred aspects of the invention, chemical granules are dispensed via the granule tube from a granule storage hopper, and seeds are dispensed through the seed dispensing tube from a seed hopper.

Although preferred arrangements of a seed and chemical dispensing system are shown in FIGS. 1 to 5, it should be noted that other arrangements, such as open container systems, are possible for achieving the desired benefits of seed and chemical dispersion. These variations which are within the scope of the invention as defined in the claims, and will be apparent to those skilled in the art.

What is claimed is:

1. A planter unit comprising:
   a seed dispensing tube for dispensing seeds, including an upper opening for receiving a seed and a lower opening for dispensing the seed;
   a brush covering the lower opening; and
   a granule tube connected to said seed dispensing tub at a location above the lower opening, for dispensing chemical granules into the seed dispensing tube,
   wherein said brush holds chemical granules within said seed dispensing tube such that chemical granules accumulate within said seed dispensing tube, and
   wherein said brush allows a seed and accumulated chemical granules to pass through the lower opening when a seed is dispensed via said seed dispensing tube.

2. A planter unit according to claim 1, wherein said seed dispensing tube further includes an overflow hole at a location above the lower opening to permit a predetermined amount of chemical granules to accumulate behind the brush, and to prevent chemical granules from building up within the seed dispensing tube.

3. A planter unit according to claim 1, wherein said brush further comprises bristles, wherein each of said bristles has a diameter of 0.008 inches.

4. A planter unit according to claim 1, wherein said brush is 1.5 inches long and 0.5 inches wide, and wherein said brush is mounted inside said seed dispensing tube.

5. A seed and chemical granule dispensing system comprising:

a seed hopper for storing seeds;

a granule storage hopper for storing chemical granules; and a planter unit comprising a seed dispensing tube for dispensing seeds stored in said seed hopper, including an upper opening for receiving a seed and lower opening for dispensing the seed, a brush covering the lower opening, and a granule tube for dispensing chemical granules stored in said granule storage hopper into said seed dispensing tube, connected to said seed dispensing tube at a location above the lower opening, wherein said brush holds chemical granules within said seed dispensing tube such that chemical granules accumulate within said seed dispensing tube, and wherein said brush allows a seed and accumulated chemical granules to pass through the lower opening when a seed is dispensed via said seed dispensing tube.

6. A seed and chemical granule dispensing system according to claim 5, wherein said seed dispensing tube further comprises an overflow hole at a location above the lower opening to permit a predetermined amount of chemical granules to accumulate behind the brush, and to prevent chemical granules from building up within the seed dispensing tube.

7. A seed and chemical granule dispensing system according to claim 5, wherein said brush further comprises bristles, wherein each of said bristles has a diameter of 0.008 inches.

8. A seed and chemical granule dispensing system according to claim 5, wherein said seed hopper is an open container.

9. A seed and chemical granule dispensing system according to claim 5, wherein said seed hopper is a closed container.

10. A seed and chemical granule dispensing system according to claim 5, wherein said granule storage hopper is an open container.

11. A seed and chemical granule dispensing system according to claim 5, wherein said granule storage hopper is a closed container.

12. A seed and chemical granule dispensing system according to claim 5, wherein said seed hopper and said granule storage hopper comprise combined two-chambered storage container.

13. A seed and chemical granule dispensing system according to claim 12, wherein said combined two-chambered storage container is an open container.

14. A seed and chemical granule dispensing system according to claim 12, wherein said combined two-chambered storage container is closed container.

15. A seed and chemical granule dispensing system according to claim 5, wherein said seed hopper further comprises a metering gate, wherein said metering gate allows one seed to enter said seed dispensing tube at a time.

16. A seed and chemical granule dispensing system according to claim 15, wherein said metering gate is mechanically operated.

17. A seed and chemical granule dispensing system according to claim 15, wherein said metering gate is electronically operated.

18. A seed and chemical granule dispensing system according to claim 5, wherein said granule storage hopper is placed higher than said seed hopper.

19. A method of dispensing seeds and chemical granules, comprising the steps of:

dispensing chemical granules through a granule tube into a seed dispensing tube, wherein the granule tube is connected to the seed dispensing tube at a location above a lower opening of the seed dispensing tube, and wherein the lower opening of the seed dispensing tube is covered with a brush; and dispensing a seed through the seed dispensing tube;

wherein the brush holds chemical granules within the seed dispensing tube such that chemical granules accumulate within the seed dispensing tube, and wherein the brush allows a seed and accumulated chemical granules to pass through the lower opening when the seed is dispensed via the seed dispensing tube.

20. A method of dispensing seeds and chemical granules according to claim 19, wherein one seed is dispensed through the seed dispensing tube at a time.

21. A method of dispensing seeds and chemical granules according to claim 20, wherein the chemical granules are dispensed via the granule tube from a granule storage hopper.

22. A method of dispensing seeds and chemical granules according to claim 20, wherein the seeds are dispensed via the seed dispensing tube from a seed hopper.

* * * * *

UNITED STATES PATENT AND TRADEMARK OFFICE
CERTIFICATE OF CORRECTION

PATENT NO.    : 6,938,564 B2              Page 1 of 1
DATED         : September 6, 2005
INVENTOR(S)   : Larry M. Conrad et al.

It is certified that error appears in the above-identified patent and that said Letters Patent is hereby corrected as shown below:

Column 7,
Line 48, "comprise combined" should read -- comprise a combined --.

Column 8,
Line 6, "is closed" should read -- is a closed --.

Signed and Sealed this

Thirteenth Day of December, 2005

JON W. DUDAS
*Director of the United States Patent and Trademark Office*